United States Patent [19]

Kindelan

[11] 4,092,883

[45] June 6, 1978

[54] LINEAR SLIDE AND SWIVEL ARRANGEMENT FOR A DIE MOLD LATHE

[75] Inventor: James J. Kindelan, Greensburg, Pa.

[73] Assignee: Overmyer Mould Company of Pennsylvania, Greensburg, Pa.

[21] Appl. No.: 759,339

[22] Filed: Jan. 14, 1977

[51] Int. Cl.² ........................... B23B 3/34; B23B 3/28
[52] U.S. Cl. .......................................... 82/3; 82/14 A
[58] Field of Search ........................ 82/3, 14 A, 14 B

[56] References Cited

U.S. PATENT DOCUMENTS

| | | | |
|---|---|---|---|
| 3,264,910 | 8/1966 | Kindelan | 82/3 |
| 3,765,208 | 10/1973 | Cozert, Jr. | 82/14 A |

*Primary Examiner*—Leonidas Vlachos
*Attorney, Agent, or Firm*—Thomas H. Murray

[57] ABSTRACT

A lathe to simultaneously machine two or more die molds in chucks of a headstock at one end of a bed used to support a saddle which is moved along a bed by a feed screw parallel to the rotational axes of the chucks. A drive in the headstock also rotates a master mold about a horizontal axis at a laterally-displaced location from the die molds. A probe provides a signal corresponding to the internal surface contour in the master mold to move cutting bars which always extend in a generally-parallel relation with the rotational axes of the chucks during machining of the die molds. A first swivel is carried by a cross slide upon the saddle. The first swivel is adjustable about a vertical axis to provide a desired angle between the direction of attack by the cutting bars and the horizontal axes of rotation by the chucks. A linear displacement assembly is supported by the first swivel and includes a movable member which is reciprocated by a piston and cylinder assembly for displacing the cutter bars according to the output signal from the tracer probe. A second swivel is supported by the movable member of the linear displacement members to angularly position tool support bars so that the bars extend in a generally-parallel relation with the horizontal axes. The tracer probe carried by a follower bar is supported by a swivel frame which is supported by the second swivel so that the follower bar extends in a generally-parallel relation with the cutter bars.

17 Claims, 3 Drawing Figures

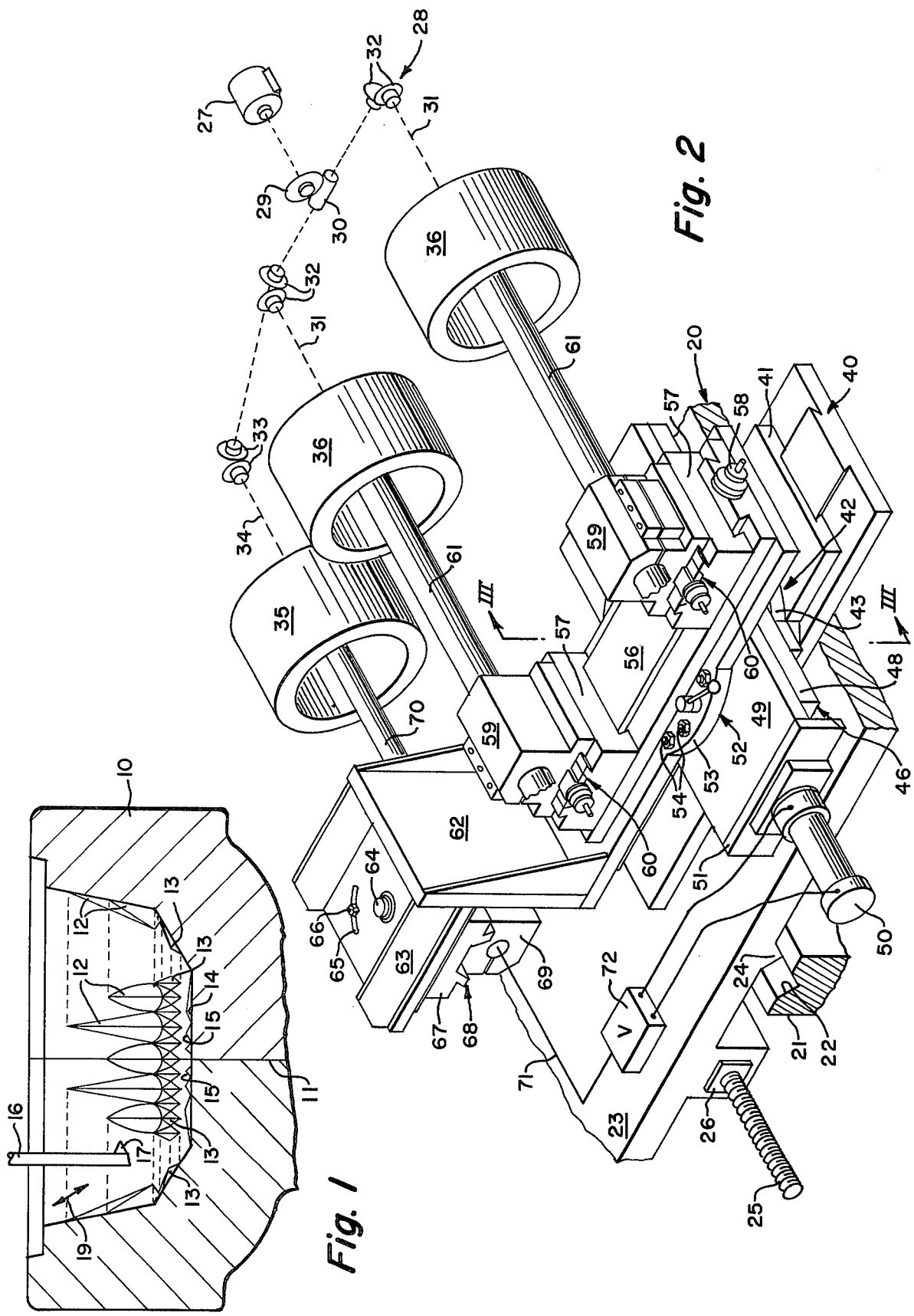

LINEAR SLIDE AND SWIVEL ARRANGEMENT FOR A DIE MOLD LATHE

BACKGROUND OF THE INVENTION

The present invention relates to a mchine tool of the type employed to carry out machining operations on die molds to duplicate the internal, external or transverse surface contours in a master mold. More particularly, the present invention relates to such a machine tool wherein the reciprocating movement of the cutting tools is along a course of travel that is angularly adjustable with respect to the rotational axes of the die molds as well as the master mold.

In my prior U.S. Pat. No. 3,264,910, there is disclosed a machine tool to carry out simultaneous machining operations under the internal surfaces of die molds while movement of the cutting tools is controlled in response to an output signal from a probe after being brought into contact with the contoured surface of the master mold. As in my prior patent, the present invention, while not limited thereto, is particularly useful for constructing a duplicator apparatus which may include the use of multiple chucks each supported for rotation by a spindle. However, conventional lathes as well as the multiple spindle head assembly disclosed in the aforesaid patent suffer from the acute disadvantage that movement of the probe as well as the cutting tools during the duplication process for certain designs becomes impossible when the probe as well as the cutting tools are reciprocated parallel to the rotational axes of the master mold and die molds. The same is true when the cutting tools and a probe are horizontally moved transverse to the rotational axes of the mold dies and master mold. Thus, for example, in a master mold for glassware, distinctive and frequently very intricate designs are to be duplicated. When the master mold defines a design by projections into the cavity thereof along a conically-reduced surface or when the designs project from two abruptly-changing mold surfaces, the mold projections overlap in the plane of the probe. In other words, a probe cannot detect mold projections from one mold surface because of interference with mold projections from the immediately adjacent mold surface. The probe is constrained to move either parallel to the rotational axis of the die mold or horizontally transverse to this rotational axis.

SUMMARY OF THE INVENTION

It is an object of the present invention to provide a machine tool for reproducing a design or a pattern of a die mold while rotated about a horizontal axis in one or more workpieces while rotated about similar horizontal axes wherein cutter bars are reciprocated in a direction of attack at a selected angle defined between the reciprocating motion of the cutter bars and the rotational axes of the workpieces.

It is a further object of the present invention to provide a linearly-displaced slide member supported by a swivel upon a saddle of a lathe or the like while the movable member of the linearly-displaced slide supports a second swivel so that one or more tool support bars are adjustably positioned to extend along an axis generally parallel to the rotational axis of a workpiece to undergo machining while the tool support bars are reciprocated along a linear course of travel which is angularly disposed with respect to the rotational axes of the workpieces.

In accordance with the present invention, there is provided in a machine tool having drive spindles with chucks rotatable about parallel horizontal axes while separately supporting a pair of die molds for machining by simultaneously movable tools carried by elongated bars that are controllably positioned in response to a tracer probe output signal corresponding to internal surface contours in a master mold while rotated about a horizontal axis at a laterally displaced location from the chucks, the machine tool including a saddle displaced by a driven feed member longitudinally of a bed along courses of travel toward and away from the chucks and generally parallel with their horizontal axes of rotation, the combination including linear displacement means carried by the saddle to simultaneously reciprocate the tools along parallel directions of attack to machine a design into the internal surfaces of the pair of die molds, first swivel means supporting the linear displacement means upon the saddle to adjustably select a desired angle between the directions of attack by the tools and the horizontal axes of rotation of the chucks, second swivel means supporting the tools while carried by the linear displacement means to angularly position the tool supporting bars so that the bars extend in a generally parallel relation with the horizontal axes of rotation of the chucks, a follower bar including a tracer probe at one end for movement along the internal surface contours in the master mold, and a swivel carrier frame supported by the second swivel means to angularly position the follower bar while carrying the tracer probe so that the follower bar extends in a generally parallel relation with the horizontal axes of rotation of the chucks while reciprocated by the linear displacement means.

In the preferred form of the present invention, the linear displacement means includes upper and lower slide members having linear bearings interposed therebetween, and a fluid actuator coupled to the slide members to displace the upper slide member relative to the lower slide member. A lower cross slide includes a movable member secured to the first swivel means for horizontally positioning thereof upon the saddle. An upper swivel means preferably supports a cross slide including movable members each adapted to support a tool holder which, in turn, supports a cutting bar and tool attached thereto. Tool holders, if desired, may be displaced by further slide means in a direction parallel to the rotational axes of the chucks.

These features and advantages of the present invention as well as others will be more fully understood when the following description is read in light of the accompanying drawings, in which:

FIG. 1 is a sectional view through the lower portion of a die mold to illustrate one particular mold surface that is suitable for duplicating by the machine tool of the present invention;

FIG. 2 is an isometric view of the machine tool incorporating the features of the present invention.

Figure 3:
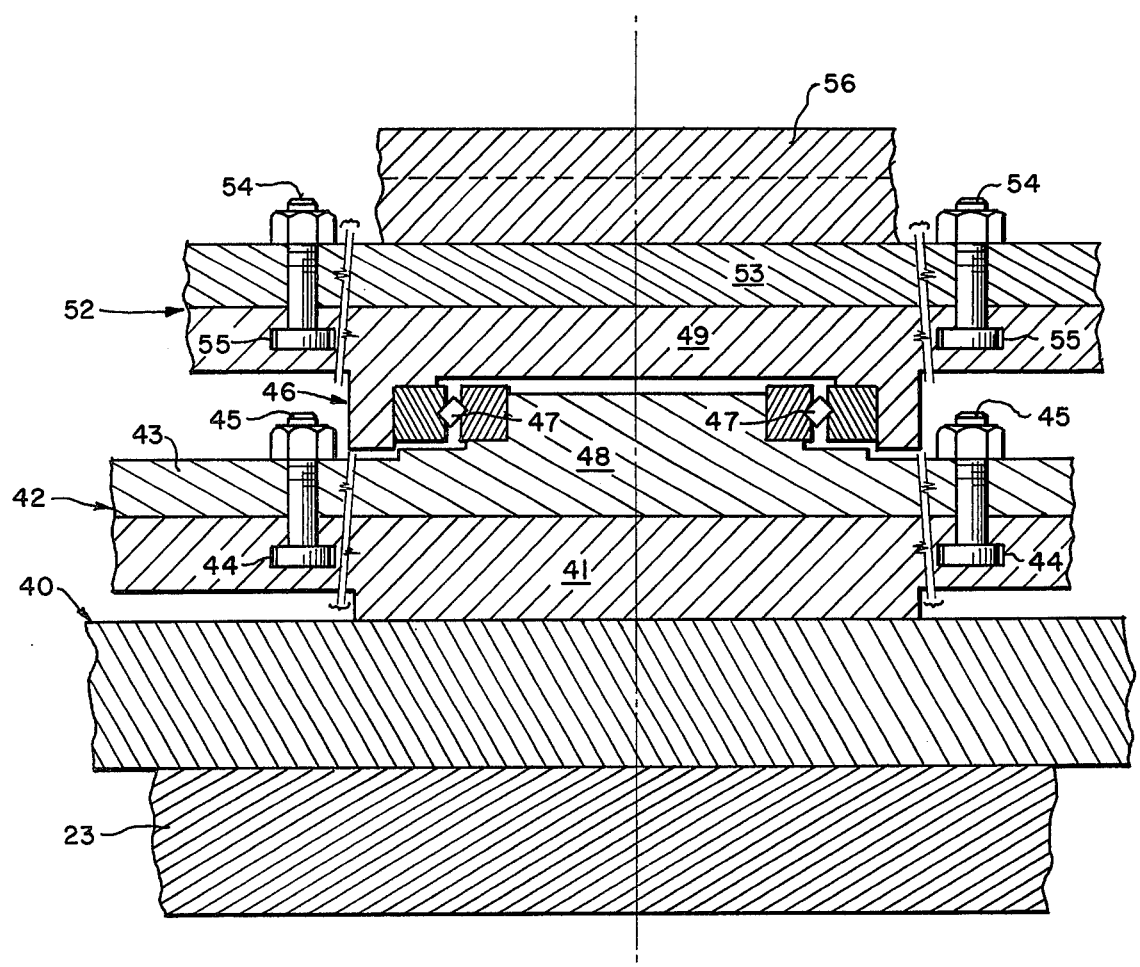
FIG. 3 is a sectional view taken along line III—III of FIG. 2.

In FIG. 1, only the lower portion 10 of a die mold is shown which is of the type employed for molds for pressing glassware but can be blow-molding glass container molds, etc. The mold is divided into mold halves along a parting line 11 or can be solid or block molds. The mold surface includes decorative projections at various locations, which include elongated spiral projections 12 having generally planar face surfaces extending from a tapered side wall of the mold. An intermediate mold surface includes diamond-like style decorations 13 which terminate just short of the actual bottom 14 of the mold. A decorative surface 15 may also project from the bottom 14. To machine these various decorative surface areas, it has been found unsatisfactory and even impossible in many instances to reciprocate a cutting bar 16 having a tool 17 at its projected end along an axis which is coaxial with the rotational axis of the die mold. This, of course, depends on the design and configuration of the die mold. However, in the die mold illustrated in FIG. 1, interference occurs during coaxial reciprocation of the cutting tool at the line of demarcation between the spiral projections 12 and the diamond-like style decorations 13. In other words, the tool cannot penetrate the mold material without interference with other decorative projections of the mold surface. To effect machining of a die mold as typically shown in FIG. 1, the present invention provides that the cutter bar 16 remains in its parallel relation with the rotational axis of the die mold when mounted on a machine tool but the reciprocation of the cutter bar is angular to any desired extent with respect to this rotational axis. This reciprocation is typically illustrated by arrow 19 in FIG. 1.

Reference is now directed to FIGS. 2 and 3, wherein there is illustrated a lathe generally indicated by reference numeral 20 having a conventional lathe bed 21 including a pair of spaced, parallel V-ways 22 (only one shown). A saddle 23 has V-guides 24 arranged to project into the V-ways 22 to guide the saddle for traversing movement along the bed while moved by a driven feed screw 25 which is coupled to the saddle by a feed nut 26. The feed screw 25 is driven in the usual well-known manner through gear reducers, not shown, but typically in the form of change gears that are rotated by a motor 27 forming part of headstock 28 of the lathe. The headstock of the lathe may be constructed in any well-known manner such as illustrated in my prior Patent No. 3,264,910. Essentially, the headstock includes a gearwheel 29 coupled to a worm gear 30 to rotate a plurality of spindles 31 through bevel gears 32. A further set of bevel gears 33 drives a spindle 34 employed to rotate a master mold 35 while spindles 31 rotate molds 36. The molds 36, being the workpieces, have a hollowed interior or exterior surface upon which a pattern is duplicated corresponding to the pattern defined by the master mold on its internal surface.

The upper surface of the saddle 23 supports a main cross slide 40 having a movable member 41 guided by a dovetail guide for horizontal movement transversely with respect to the rotational axes of the spindles 31. In the embodiment of the invention shown in FIGS. 2 and 3, the movable member 41 defines, by its upper surface, one part of a lower swivel 42 which includes a rotatable member 43. An annular T-slot 44 arranged coaxially with the vertical swivel axis supports bolts 45 which extend through openings drilled in the movable plate 43 so that hold-down nuts can be torqued to a desired extent for locking the movable swivel plate at a desired angle with respect to the rotational axes of spindles 36 and traversing movement of the saddle. This angular arrangement of the lower swivel brings about an angular positioning of a linear slide 46. The linear slide need not be part of the swivel plate 43. The linear slide includes linear bearings 47 disposed at opposite sides of a central projection 48 extending along the length of the swivel plate 43. The bearings 47 support at their opposite sides a movable slide plate 49. Linear motion of the movable slide 46 is provided by a piston and cylinder assembly 50. As illustrated in FIG. 2, the piston and cylinder assembly 50 is secured at its cylinder portion by a bracket 51 to the movable plate 49. The rod end of the piston is secured by a clevis mounting (not shown) to the central projection 48 of swivel plate 43. This arrangement of parts is such that the admission of hydraulic fluid to either side of the piston reciprocates the cylinder portion and thereby the movable plate 49 for linear motion of the slide. To minimize the dimension of the parts as well as the number of parts, the present invention also provides that the movable slide 46 is part of an upper swivel 52 which includes a swivel plate 53 movable about a vertical axis which corresponds to the vertical swivel axis of the lower swivel 42. The swivel plate 53 has a plurality of holes at spaced-apart locations about a circle to receive the shank portion of bolts 54 that are supported in an annular T-slot 55 formed in the movable plate 49 of the linear slide 46.

Upon the top surface of the swivel plate 53 there is secured a stationary part 56 of a cross slide having a plurality of movable saddle members 57 that are moved along the slide by a feed screw 58 (FIG. 2). The feed screw 58 is employed to adjust the separation between block tool holder 59 that is also supported by linear slides 60 arranged to advance and retract cutting bars 61 into and out of the molds 36. The cutting bars 61 support in the usual well-known manner cutting tools at their projected end for machining the internal surface of the molds.

The movable swivel member 53 includes an upstanding frame 62 secured to one end thereof to support a horizontally-arranged bracket 63. The bracket includes a swivel pin 64 and an annular slot 65 through which a lock bolt 66 extends while secured to the stationary portion 67 of a linear slide 68. A movable member of slide 68 supports a carrier 69 for a follower bar 70 having a tracer pin extending laterally therefrom at its extended end to engage the internal surface of the master mold.

As the master mold is rotated, the tracer pin is subjected to varying horizontally-directed pressures by the contour of the design. These pressures are translated into electrical signals by the transducer. The electrical signals are transmitted by line 71 to a control circuit 72 which includes a valve. The control circuit 72 controls the speed and direction of movement of the cylinder portion of piston and cylinder assembly 50. Since the cutter bars 61 and follower bar 70 are ultimately supported by linear slide plate 49 of the linear slide, they move together in response to operation of the piston and cylinder assembly 50. More specifically, the follower bar is supported by the upper swivel and maintained parallel with the cutter bars 61 by appropriate adjustment about swivel pin 64.

To carry out a machining operation according to the apparatus of the present invention, the lower swivel is positioned at a desired angle so that the movable plate thereof is angularly arranged with respect to the main cross slide 40. The lower swivel is then locked into this position by torquing the nuts associated with bolts 45 in the T-slot. This adjustment would normally bring about an angular position between the cutting bars and the rotational axes of spindles 31. However, the cutting bars remain parallel with respect to the axes of rotation of the spindles 31 through the use of the upper swivel by adjusting plate 53 to return the cutter bars to a parallel relation with the spindles. The linear slide 46 displaces ultimately the cutting bars as well as the probe along the same direction of travel which is usually not coaxial with the rotational axes of the spindles. The swivel pin 66 is employed to angularly position the follower bar to maintain a parallel-extending relation with the cutting bars 61. The linear slide 68 is employed to position the follower bar 70 in an axial direction. The position of the tools with respect to the molds 36 is achieved through the combination of adjustments to the main cross slide 40, the upper cross slide 57 through the adjustment of feed screw 58 as well as longitudinal positioning by slides 60.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a machine tool having a saddle displaced by a driven feed member longitudinally along a bed for movement parallel to the rotational axis of chuck means adapted to support at least one workpiece at one end of the bed while the chuck is rotated by a drive in a predetermined relation to the rotation of a pattern at a laterally-displaced location where a tracer probe produces a signal corresponding to a desired movement of tool means to duplicate a surface contour of the pattern in the workpiece, the combination comprising:

a linear slide means including a linearly-displaced member to simultaneously reciprocate said tracer probe and said tool means along parallel directions of attack in response to said signal produced by the tracer probe to move the tool means for duplicating surface contours of the pattern in the workpiece, a lower swivel means including a member rotatable about a generally vertical axis while supported by said saddle to adjustably select a desired angle between said directions of attack and the rotational axis of said chuck means, an upper swivel means essentially consisting of a single upper swivel member rotatable about a single generally vertical axis upon a swivel support surface carried by the linearly-displaced member of said linear slide means, said single upper swivel member supporting and angularly positioning said tool means and said tracer probe means to always extend from the single upper swivel member in a generally parallel relation with the rotational axis of the chuck means, tool holder means receiving said tool means for support by said single upper swivel member, a carrier frame carrying said tracer probe for support by said single upper swivel member, and fluid-actuator means coupled to said linear slide means to reciprocate said tracer probe and said tool means along said parallel directions of attack while the tracer probe and tool means extend from said single upper swivel member in the generally parallel relation with the rotational axis of the chuck means.

2. The combination according to claim 1 wherein said carrier frame includes a swivel frame means rotatable about a generally vertical axis for positioning said probe.

3. The combination according to claim 2 wherein said adjustable means further includes a support slide having a horizontally-movable member, and a probe holder secured to the horizontally-movable member of said support slide.

4. The combination according to claim 3 wherein each one of said lower swivel means, said upper swivel means and said probe swivel frame means includes locking means to secure the movable member thereof against rotation about the vertical axis thereof.

5. The combination according to claim 1 wherein said tool holder means includes a plurality of independent tool clamping members, one each supporting a tool for machining a respective one of a plurality of workpieces secured to separate chucks forming said chuck means.

6. The combination according to claim 5 further comprising an upper cross slide means including a movable carrier to separately support each of said clamping members for movement along said upper swivel means.

7. The combination according to claim 6 further comprising means to slideably position each of said clamping members by a displacement in a direction normal to displacements by the movable carrier of said upper cross slide.

8. The combination according to claim 1 wherein said fluid-actuator means includes a piston and cylinder assembly, and wherein the combination further comprises valve means responsive to the signal from said probe means to actuate said piston and cylinder assembly.

9. The combination according to claim 1 wherein the movable member of said linear slide means includes an annular T-slot concentrically arranged with respect to the generally vertical axis of rotation by said single upper swivel member of said upper swivel means, and fastening members carried within said T-slot to releasably secure thereto the single upper swivel member of said upper swivel means.

10. The combination according to claim 1 wherein said lower swivel means includes fastening means supported within an annular T-slot concentrically arranged with respect to the generally vertical axis of rotation of the rotatably movable member thereof to releasably secure the movable member against such rotation.

11. The combination according to claim 1 wherein the rotatably movable members of each of said lower and upper swivel means are rotatable about parallel vertical axes.

12. The combination according to claim 1 further comprising a lower cross slide means including a movable carrier supported by said saddle while carrying said lower swivel for movement transversely to the movement of said saddle along said bed.

13. In a machine tool having drive spindles with chucks rotatable about parallel, horizontal axes while separately supporting a pair of die molds for machining by simultaneously movable tools carried by elongated bars that are controllably positioned in response to a tracer probe output signal corresponding to internal surface contours in a master mold while the mold is rotated about an axis parallel to said horizontal axes at a laterally-displaced location from said chucks, said machine tool including a saddle displaced by a driven feed member longitudinally of a bed along a course of travel toward and away from said chucks and generally parallel with said horizontal axes, the combination including:

linear displacement means carried by said saddle to simultaneously reciprocate said tools along parallel directions of attack to machine a design into the internal surfaces of said pair of die molds, first swivel means supporting said linear displacement means upon said saddle to adjustably select a desired angle between said directions of attack and said horizontal axes, second swivel means supporting said tools while carried by said linear displacement means to angularly position said bars while carrying said tools so that the bars extend in a generally-parallel relation with said horizontal axes, a follower bar including a tracer probe at one end for movement along the internal surface contours in said master mold, and a swivel carrier frame supported by said second swivel means to angularly position said follower bar while carrying said tracer probe so that said follower bar extends in a generally-parallel relation with said horizontal axis while reciprocated by said linear displacement means.

14. The combination according to claim 13 wherein said linear displacement means includes upper and lower slide members having linear bearings interposed therebetween, and a fluid actuator coupled to said slide members to displace the upper slide member relative to the lower slide member.

15. The combination according to claim 13 further comprising upper cross slide means including movable members to independently support said cutting bars at desired relative locations upon said swivel means.

16. The combination according to claim 15 further comprising lower cross slide means including a movable member carrying said first swivel means for horizontal positioning thereof upon said saddle transversely to the displacement thereof by said driven feed member.

17. The combination according to claim 13 further comprising drive means to simultaneously rotate said die molds and said master mold.

* * * * *